US012782211B2

(12) United States Patent
Xia et al.

(10) Patent No.: US 12,782,211 B2
(45) Date of Patent: Nov. 3, 2026

(54) SENSING ARRANGEMENT

(71) Applicant: Contactile Pty Ltd, Coogee (AU)

(72) Inventors: Benjamin Xia, Castle Hill (AU); Heba Khamis, Coogee (AU)

(73) Assignee: Contactile Pty Ltd, Coogee (AU)

( * ) Notice: Subject to any disclaimer, the term of this patent is extended or adjusted under 35 U.S.C. 154(b) by 257 days.

(21) Appl. No.: 18/408,996

(22) Filed: Jan. 10, 2024

(65) Prior Publication Data

US 2024/0230436 A1 Jul. 11, 2024

(30) Foreign Application Priority Data

Jan. 10, 2023 (AU) ................................ 2023900046

(51) Int. Cl.

| | |
|---|---|
| ***G01L 3/08*** | (2006.01) |
| ***G01L 1/24*** | (2006.01) |
| ***G01L 3/14*** | (2006.01) |
| ***G01L 5/00*** | (2006.01) |

(52) U.S. Cl.
CPC . *G01L 3/08* (2013.01); *G01L 1/24* (2013.01)

(58) Field of Classification Search
CPC ... G01D 5/34715; B25J 13/084; B25J 13/083; B25J 9/1612; B25J 19/021; A61B 5/1107; A61B 5/1079; A61B 34/30; A61B 5/6885; G06V 10/811; G01J 3/46; G01J 1/4228; G01L 1/26; G01L 1/24; G01L 1/248; G01L 3/12; G01L 3/08; G06F 3/014; G01B 11/16; G01B 11/24; F21V 23/0471; A61M 39/10; G02B 23/2461
See application file for complete search history.

(56) References Cited

U.S. PATENT DOCUMENTS

| | | | |
|---|---|---|---|
| 9,513,178 B2 | 12/2016 | Cserey et al. | |
| 2015/0177082 A1* | 6/2015 | Sawada .................. | G01L 5/166 901/47 |
| 2017/0363464 A1 | 12/2017 | Shafer et al. | |
| 2022/0283303 A1 | 9/2022 | Kato et al. | |
| 2022/0397469 A1 | 12/2022 | Katsuhara et al. | |

FOREIGN PATENT DOCUMENTS

| | | |
|---|---|---|
| EP | 2034287 A1 | 3/2009 |
| KR | 102233746 B1 | 3/2021 |
| WO | 2011/128266 A1 | 10/2011 |
| WO | 2013/072712 A1 | 5/2013 |
| WO | 2019/033159 A1 | 2/2019 |
| WO | 2021/081084 A1 | 4/2021 |
| WO | 2022/148542 A1 | 7/2022 |
| WO | 2022/217120 A2 | 10/2022 |

OTHER PUBLICATIONS

Australian Search Report issued in App. No. 2023900046 dated Aug. 7, 2023, 20 pages.

European Search Report and Written Opinion received for EP Patent Application No. 24151072.6, mailed on Jun. 5, 2024, 7 pages.

* cited by examiner

*Primary Examiner* — Brandi N Hopkins
(74) *Attorney, Agent, or Firm* — DILWORTH IP, LLC

(57) ABSTRACT

Sensing arrangements for measuring force or torque by transmitting light on a reflective region and measuring how the reflected light is received, including a sensor arrangement that uses a non-symmetric reflective region and a sensor arrangement that uses multiple arrangements of at least three light sensors, where the at least three light sensors are arranged such that they are not co-linear.

60 Claims, 17 Drawing Sheets

SENSING ARRANGEMENT

CROSS-REFERENCE TO RELATED APPLICATIONS

The application claims priority to Australian Provisional Patent Application No. 2023900046 filed on Jan. 10, 2023, the contents of which are incorporated herein by reference.

FIELD OF THE INVENTION

The present invention relates to a sensor, and in particular to a sensor for measuring Z-axis rotation or torque.

The invention has been developed primarily for use in/with robotics and will be described hereinafter with reference to this application. However, it will be appreciated that the invention is not limited to this particular field of use.

BACKGROUND OF THE INVENTION

Robots are reasonably capable at gripping objects they are familiar with, where the robot "knows" the shape, weight or surface properties of the object. This may be adequate for some industrial solutions where environments are structured and repetitive, however, in unstructured environments, robots are required to manipulate objects they have never encountered before.

PCT/AU2018/050859 ("PCT 859") discloses a system and method associated with robotic contact sensors and, in particular, discloses:

" . . . a method of detecting torque normal to a contact surface, the method comprising providing a plurality of protrusions extending from a base surface to a tip, measuring displacement of the tip in three dimensions, estimating forces applied to the tip in three dimensions, measuring deflection around a normal axis to the base surface at the point at which the protrusion extends."

PCT 859 also discloses that the measurement of forces in three dimensions allows the array of protrusions to estimate torque because the x-y deflection or curl of force around the Z-axis can be sensed. This estimation of torque allows for increased grip security as the grip force can be increased to account for increasing torque as appropriate.

It is important to note, however, that PCT 859 is purely a contact sensor. It can only be used as the contact surface and is not suitable for mounting between two parts, such as in a robotic joint.

The present invention seeks to provide a sensor, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, a sensing arrangement is provided for measuring a force or torque applied to a distal end of a body, the sensing arrangement comprising: a base comprising at least one input portion, the at least one input portion comprising:

a light control portion;

at least one light source; and a two-dimensional light sensor array having at least two rows and two columns; and the body connected, at a proximal end, to the base, the body comprising:

a resilient support;

at least one alternative light transmission region corresponding to the at least one input portion and extending from the proximal end towards the distal end and terminating at a light transmission region termination; and a reflective region that is not symmetric about at least one axis and is located at the light transmission region termination;

wherein the at least one light source is configured such that it emits light towards the reflective region;

the sensing arrangement being such that, in respect of one of the at least one input portions and a corresponding one of the at least one alternative light transmission regions in use, light from the at least one light source passes through the alternative light transmission region towards the reflective region, is reflected by the reflective region through the light control portion onto the two dimensional light sensor array, in use, such that the two dimensional light sensor array receives a light signature that corresponds to a force or torque applied to the distal end of the body.

Advantageously, the sensing arrangement can measure force or torque applied to a distal end of the body, irrespective of whether the distal end of the body is in direct contact with an object being gripped or is another component of a robot or machine.

Since the sensing arrangement comprises a single body connected to the base, the overall arrangement can be less physically complex than some prior art arrangements.

Advantageously, the reflective region that is not symmetric about at least one axis allows for Z-axis rotation and torque to be measured where only one input portion is provided. It can also measure 3D force.

In one embodiment, the body comprises a mounting member at its distal end for mounting the sensing arrangement to an object to be sensed.

In one embodiment, the mounting member is attached to the body at its distal end by mechanical interlock.

In one embodiment, the mounting member is attached to the resilient support of the body at its distal end by mechanical interlock.

In one embodiment, the sensing arrangement comprises a contact surface wherein the contact surface is provided by the resilient support at a distal end of the body.

In one embodiment, the contact surface is curved.

In one embodiment, the reflective region is an inner surface region of the resilient support.

In one embodiment, the reflective region is a reflector located at the inner surface region.

In one embodiment, the reflective region is a surface of the mounting member.

In one embodiment, the reflective region is oval in shape.

In one embodiment, the reflective region is elliptical in shape.

In one embodiment, a proximal end of the at least one alternative light transmission regions extend from the base.

In one embodiment, the at least one alternative light transmission regions is a cavity.

In one embodiment, the cavity is filled with a fluid.

In one embodiment, the fluid is air.

In one embodiment, the fluid is a substantially transparent oil.

In one embodiment, the cavity is filled with a substantially transparent silicone.

In one embodiment, the two dimensional light sensor array is:

(i) an arrangement of at least four light emitting diodes (LEDs);

(ii) an arrangement of at least four photo diodes;

(iii) a complementary metal-oxide-semiconduction (CMOS) image sensor; or (iv) a charged coupled device (CCD) image sensor.

In one embodiment, the base comprises a printed circuit board and the at least one light source is mounted to the printed circuit board.

In one embodiment, the light control portion comprises an aperture.

In one embodiment, the aperture is circular.

In one embodiment, the light control portion extends between the reflector and the two dimensional light sensor array.

In one embodiment, the printed circuit board is substantially adjacent to the light control portion.

In one embodiment, the at least one input portion is two or more input portions and the at least one alternative light transmission region is two or more alternative light transmission regions, each alternative light transmission region corresponding to an input portion.

In one embodiment, the reflective region is a diffuse reflective region.

In one embodiment, the base further comprises a housing enclosing the light control portion, the at least one light source and the two dimensional light sensor array, the housing being fixed in relation with a proximal end of the resilient support.

In one embodiment, the base comprises a printed circuit board to which are mounted, the (i) at least one light source, (ii) light control portion and (iii) two-dimensional light sensor array, such that the light control portion extends between the reflective region and the two-dimensional light sensor array.

In one embodiment, the light control portion has an outside form factor approximating a truncated cone, is substantially thin-walled and the aperture is located through the thin-wall and aligned with the axis of the truncated cone.

In one embodiment, the at least one light source is located adjacent to the truncated cone within the alternative light transmission region.

In one embodiment, the resilient support is an opaque dark-coloured silicone.

According to a second aspect of the present invention, a sensing arrangement is provided for measuring a force or torque applied to a distal end of a body, the sensing arrangement comprising:

two or more light management arrangements, each light management arrangement comprising:

a base portion comprising an input portion, the input portion comprising:

a light control portion;

at least one light source; and an arrangement of at least three light sensors, where the at least three light sensors are arranged such that they are not co-linear;

a body portion connected, at a proximal end, to the base portion, the body portion comprising:

a resilient support portion; and an alternative light transmission region corresponding to the input portion and extending from the proximal end towards the distal end of the body and terminating at a light transmission region termination; and a reflective region located at the light transmission region termination;

wherein the at least one light source is configured such that it emits light towards the reflective region;

wherein, in respect of the two or more light management arrangements, the base portions form a base, the resilient support portions are integral and form a resilient support and the body portions form a body;

each of the two or more light management arrangements being arranged such that, in use, light from the at least one light source passes through the alternative light transmission region towards the reflective region, is reflected by the reflective region through the light control portion onto the arrangement of at least three light sensors, such that the arrangement of at least three light sensors receives a light signature that corresponds to a force or torque applied to the distal end of the body portion. Advantageously, the sensing arrangement can measure force or torque applied to a distal end of the body, irrespective of whether the distal end of the body is in direct contact with an object being gripped or is another component of a robot or machine.

Since the sensing arrangement comprises a single body connected to the base, the overall arrangement can be less physically complex than some prior art arrangements.

Advantageously, the provision of at least two light management arrangements allows for Z-axis rotation and Z-torque to be measured. Two light management arrangements also allow measurement of 3D force and 3D displacement, Z-rotation and Z-torque and rotation and rotation and torque around the axis defined by the line connecting the two light sensing management arrangements (that is, not just Z-rotation and Z-torque).

In one embodiment, the body comprises a mounting member at its distal end for mounting the sensing arrangement to an object to be sensed.

In one embodiment, the mounting member is attached to the body at its distal end by mechanical interlock.

In one embodiment, the mounting member is attached to the resilient support at a distal end of the body by mechanical interlock.

In one embodiment, the sensing arrangement comprises a contact surface wherein the contact surface is provided by the resilient support at a distal end of the body.

In one embodiment, the contact surface is curved.

In one embodiment, the reflective region is an inner surface region of the resilient support.

In one embodiment, the reflective region is a reflector located at the inner surface region.

In one embodiment, the reflective region is a surface of the mounting member.

In one embodiment, the reflective region is non-symmetric about at least one axis.

In one embodiment, the reflective region is oval in shape.

In one embodiment, the reflective region is elliptical in shape.

In one embodiment, the reflector region is symmetric about 2 axes.

In one embodiment, the reflector region is circular in shape.

In one embodiment, a proximal end of the alternative light transmission region extends from the base portion.

In one embodiment, the alternative light transmission region is a cavity.

In one embodiment, the cavity is filled with a fluid.

In one embodiment, the fluid is air.

In one embodiment, the fluid is a substantially transparent oil.

In one embodiment, the cavity is filled with a substantially transparent silicone.

In one embodiment, the arrangement of at least three light sensors is:

(i) an arrangement of three LEDs;
(ii) an arrangement of three photo diodes;
(iii) a complementary metal-oxide-semiconduction (CMOS) image sensor; or
(iv) a charged coupled device (CCD) image sensor.

In one embodiment, the base comprises a printed circuit board and the at least one light source of each base portion is mounted to the printed circuit board.

In one embodiment, the light control portion comprises an aperture.

In one embodiment, the aperture is circular.

In one embodiment, the light control portion is arranged to control the light received by the arrangement of at least three light sensors.

In one embodiment, the at least one input portion is two or more input portions and the at least one alternative light transmission region is two or more alternative light transmission regions, each alternative light transmission region corresponding to an input portion.

In one embodiment, the reflective region is a diffuse reflective region.

In one embodiment, the base further comprises a housing enclosing the printed circuit board, the light control portion, the at least one light source and the arrangement of at least three light sensors, the housing and the proximal end of the resilient support being in fixed relation.

In one embodiment, the resilient support is an opaque, black-coloured silicone.

In one embodiment, the base comprises a printed circuit board and in respect of each base portion, the (i) at least one light source, (ii) light control portion and (iii) arrangement of at least three light sensors, are mounted to the printed circuit board such that the light control portion extends between the reflective region and the arrangement of at least three light sensors.

In one embodiment, the light control portion has an outside form factor approximating a truncated cone, is substantially thin-walled and the aperture is located through the thin-wall and aligned with the axis of the truncated cone.

In one embodiment, the at least one light source is located adjacent to the truncated cone within the alternative light transmission region.

According to another aspect of the present invention, a method is provided for measuring a force or torque applied to a distal end of a body, the method comprising the following steps:

emitting a light from a light source towards a reflective region located in a direction towards the distal end of the body;
reflecting the light by the reflective region towards a light control device;
controlling the signature of the light using the light control device to exclude a portion of the light; and
receiving the remaining portion of the light at a two dimensional light sensor array having at least two rows and two columns to provide a light signature output;
wherein the reflective region is not symmetric about at least one axis such that the light signature output is indicative of the force or torque applied to the distal end of the body.

Advantageously, the method can measure force or torque applied to a distal end of the body, irrespective of whether the distal end of the body is in direct contact with an object being gripped or is another component of a robot or machine.

Advantageously, the reflective region that is not symmetric about at least one axis allows for Z-axis rotation and torque to be measured.

According to another aspect of the present invention, a method is provided for measuring a force or torque applied to a distal end of a body, the method comprising the following steps:

carrying out two or more light sensing procedures using a corresponding two or more light management arrangements, each of the light management arrangements comprising a body portion, wherein the body portions are integrally formed to form the body, each light sensing procedure including the following steps:
emitting a light from a light source towards a reflective region located in a direction towards the distal end of the respective body portion;
reflecting the light by the reflective region towards a light control device;
controlling the signature of the light using the light control device to exclude a portion of the light; and
receiving the remaining portion of the light at an arrangement of at least three light sensors, where the at least three light sensors are arranged such that they are not co-linear. to provide a light signature output;
such that the two or more light signature outputs are, when considered together, indicative of the force or torque applied to the distal end of the body.

Advantageously, the method can measure force or torque applied to a distal end of the body, irrespective of whether the distal end of the body is in direct contact with an object being gripped or is another component of a robot or machine.

Since the sensing arrangement comprises an integral body connected to the base, the overall arrangement can be less physically complex than some prior art arrangements.

Advantageously, the provision of at least two light sensing procedures using a corresponding two or more light management arrangements, each comprising a body portion, wherein the body portions are integrally formed to form the body, allows for Z-axis rotation and Z-torque to be measured. Two light sensing procedures also allow measurement of 3D force and 3D displacement, Z-rotation and Z-torque and rotation and torque around the axis defined by the line connecting the two light sensing management arrangements (that is, not just Z-rotation and Z-torque).

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION OF THE INVENTION

Figure 1:
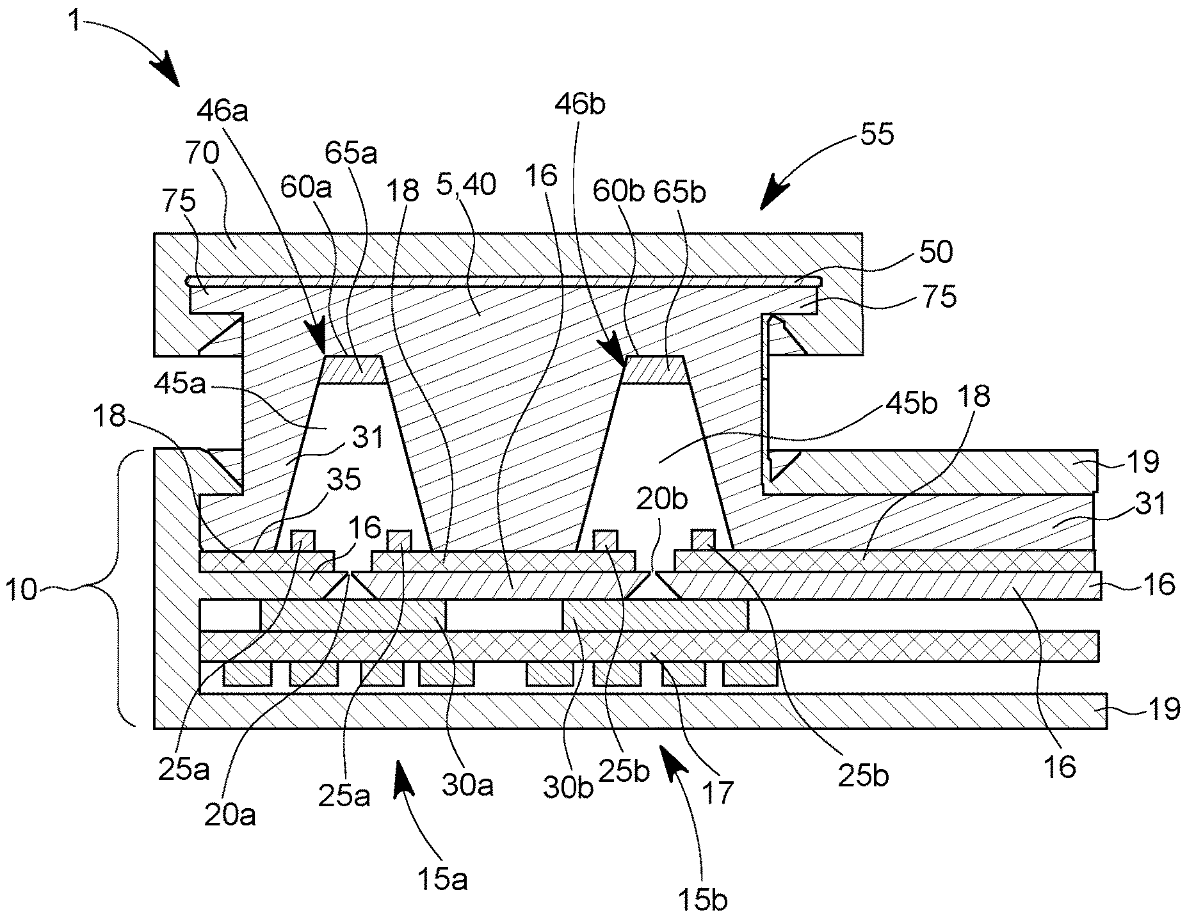
FIG. 1 shows a cross-sectional schematic view of a first embodiment of a sensing arrangement.

It should be noted in the following description that like or the same reference numerals in different embodiments denote the same or similar features.

Figure 2:
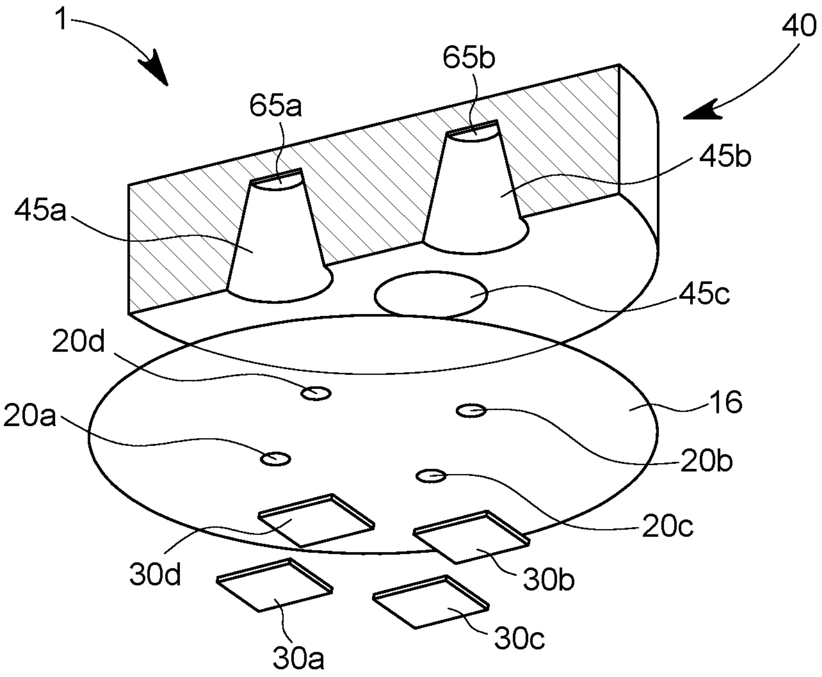
FIG. 2 shows a bottom isometric exploded view of some parts of the sensing arrangement of the first embodiment, where a resilient support member of the sensing arrangement is shown in cross-section.
Figure 3:
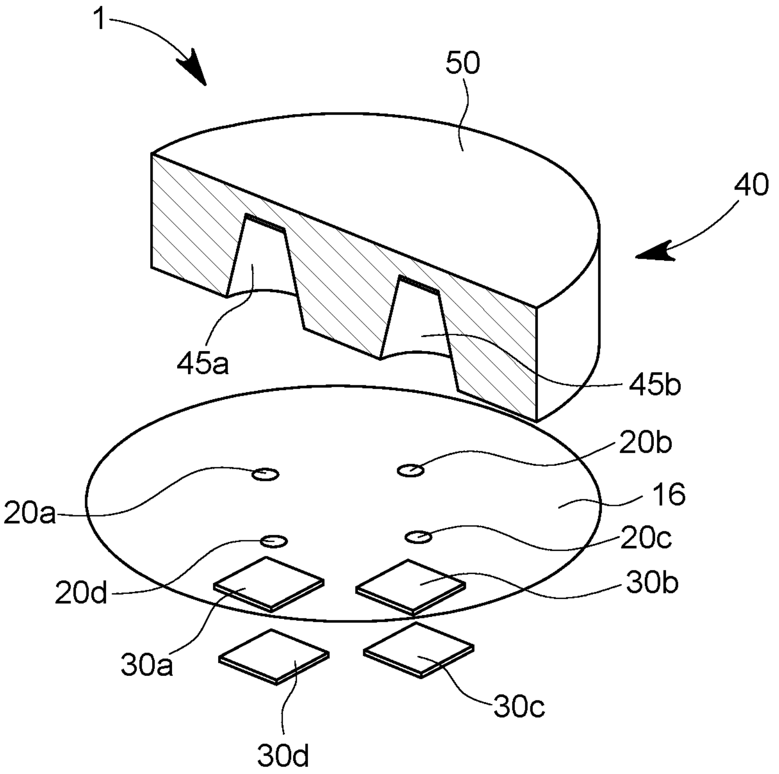
FIG. 3 shows a top isometric exploded view of some parts of the sensing arrangement of the first embodiment, where a resilient support member of the sensing arrangement is shown in cross-section.

A sensing arrangement according to the first embodiment of the invention is shown in FIGS. 1 to 3, generally indicated by the numeral 1. The sensing arrangement 1 has a body 5 and can measure a force or torque applied to a distal end 55 of the body 5.

The sensing arrangement 1 has a base 10 which, in turn, has four input portions of which two are shown as 15*a*, 15*b* (15*c* and 15*d* not shown).

For ease of explanation, given the cross-sectional perspectives shown in the drawings, it should be appreciated that the elements not shown but of the same type as the elements shown, function in the same way. For example, those input portions denoted by the addition of "c", "d" to the drawing reference, function in the same way as to the two input portions 15*a*, 15*b* and are only not shown because of the cross-sectional perspective.

The base also has a light control member taking the form of a panel 16 and a printed circuit board 18 on which the panel 16 is seated, a second printed circuit board 17 and a casing 19. In this embodiment, the panel 16 is adhered to the printed circuit board 18 by a suitable adhesive. In other embodiments the panel 16 may be positionally fixed with respect to the rest of sensing arrangement 1 by any suitable means. Each of the four input portions 15*a*, 15*b* (15*c*, 15*d* not shown) has:

1. a light control portion in the form of circular apertures 20*a*, 20*b* (20*c*, 20*d* not shown) defined in the panel 16.
2. a light source in the form of a four LED array 25*a*, 25*b* (25*c*, 25*d* not shown). In each array the LEDs are spaced in an equidistant manner. and;
3. a two-dimensional light sensor array having at least two rows and two columns in the form of a four photo diode array 30*a*, 30*b* (30*c*, 30*d* not shown).

The LED arrays 25*a*, 25*b* are mounted on the printed circuit board 18. The photo diode arrays 30*a*, 30*b* are mounted such that each array is centered immediately below, adjacent to and in alignment with a respective circular aperture 20*a*, 20*b*.

The photo diode arrays 30*a*, 30*b* are mounted on the second printed circuit board 17.

The printed circuit boards 17, 18 could comprise a series of connected printed circuit boards or any electrically connected arrangement that provides the required function.

The second printed circuit board 17 is electrically connected to the printed circuit board 18 by a cable that extends through an aperture in the panel 16. The panel 16 is made of a thermoplastic polymer—Acrylonitrile butadiene styrene (ABS).

The input portions 15*a*, 15*b*, panel 16, printed circuit board 18 and second printed circuit board 17 are all enclosed within the casing 19. In this embodiment the casing 19 is made of a thermoplastic polymer—Acrylonitrile butadiene styrene (ABS) but may, in other embodiments, be made of any other suitable rigid material, such as a metal or polymer.

The body 5 is connected, by mechanical interlock 31, at a proximal end 35, to the casing 19. The mechanical interlock 31 is provided by the body 5 which has a partially surrounding rib portion. The rib is engaged by the casing 19.

It should be noted that FIGS. 2 & 3 do not show all of the body or panel which are shown to extend out in a transverse direction as shown in FIG. 1.

The body 5 has a resilient silicone support 40 defining four alternative light transmission regions taking the form of cavities within resilient silicone support 40, two of which are shown 45*a*, 45*b* in FIG. 1 (45*c*, 45*d* not shown), corresponding to the input portions 15*a*, 15*b*. The cavities are filled with air in this embodiment.

The cavities 45*a*, 45*b* extend from the proximal end 35 towards a distal end 50 of the resilient silicone support 40, near the distal end 55 of the body 5, and terminate at light transmission region terminations being, in this case, four terminations 60*a*, 60*b* (60*c*, 60*d* not shown) of cavities 45*a*, 45*b* (65*c*, 65*d* not shown).

The body 5 has four reflective regions 65*a*, 65*b* (65*c*, 65*d* not shown) located at the terminations 60*a*, 60*b* (60*c*, 60*d* not shown) of cavities 45*a*, 45*b* (45*c*, 45*d* not shown). In this embodiment, the reflective region is provided at four inner surface regions 46*a*, 46*b* (46*c*, 46*d* not shown) of the resilient silicone support 40.

In this embodiment, the reflective regions 65*a*, 65*b* (65*c*, 65*d* not shown) are formed of an opaque, white coloured silicone that reflects light well but in a diffuse manner. The remainder of the resilient silicone support 40 is made from a dark coloured silicone, in this case black, in this embodiment to reduce light reflection interference. The internal surface of the cavities 45*a*, 45*b* (45*c*, 45*d* not shown) are matte to reduce reflection interference further. This matte surface texture is achieved during the molding process by molding the silicone in a mold with a correspondingly textured surface. The dark colour of the silicone, together with the matte surface texture of the cavities 45*a*, 45*b* (45*c*, 45*d* not shown) make the resilient support substantially opaque to light emitted by the light source and reflected by the four reflective regions 65*a*, 65*b* (65*c*, 65*d* not shown). The reflective regions 65*a*, 65*b* (65*c*, 65*d* not shown) are co-molded with the remainder of the resilient silicone support 40.

Importantly, in other embodiments where only a single input portion and associated elements (e.g. reflective region, cavity) are provided, the reflective regions 65*a* must not reflect light symmetrically about at least one axis in order for the sensing arrangement to be able to read Z-axis torque. For example, the reflective region might be oval or elliptical in shape.

The LED arrays 25*a*, 25*b* (25*c*, 25*d* not shown) are directed to emit light towards the corresponding reflective regions 65*a* and 65*b* (65*c*, 65*d* not shown) in a relatively uniform manner. A person skilled in the art will understand that any arrangement or number of LEDs, in fact, any light source that sufficiently illuminates the reflector will be suitable. It is desirable that the light source illuminates the reflector as evenly as possible but even uneven illumination can be calibrated out.

In relation to the first input portion 15*a*, light emitted by LED array 25*a* passes through the cavity 45*a* towards the reflective region 65*a*. The reflective region 65*a* causes the light to be reflected through the circular aperture 20*a* and onto the photo diode array 30*a*, in use. This causes the photo diode array 30*a* to receive a light signature that corresponds to a 3D force applied to the distal end 55 of the body because as the distal end 55 of the body moves, the light will be reflected off the reflective region 65*a* in a different way.

Advantageously, the sensing arrangement 1 can measure force or torque applied to a distal end 55 of the body 5, irrespective of whether the distal end 55 of the body 5 is in direct contact with an object being gripped or is another component of a robot or machine.

In this case, the body 5 comprises a mounting member or arrangement 70 at its distal end 55. The mounting member 70 is attached to the body 5, specifically to the resilient silicone support 40) at its distal end 55 by mechanical interlock 75 as shown in FIG. 1.

The mounting arrangement 70 is adapted for connection to another component of a robot, for example a robotic limb, hand or finger. The connection may be by any suitable means, such as by bolt and nut, screw or adhesive.

In the case that the distal end 55 is used to directly grip an object, since the sensing arrangement 1 comprises a single body 5 connected to the base 10, the overall arrangement 1 can be less physically complex than some prior art arrangements. For example, where many bodies or protrusions are provided to grip an object. See for example, the Embodiment of FIG. 5.

Advantageously, the reflective regions 65*a*, 65*b* that are not symmetric about at least one axis allows for Z-axis rotation and torque to be measured.

Whilst in this embodiment the reflective regions 65*a*, 65*b* are oval in shape, they need not be. However, in embodiments that only have a single cavity, the reflective region needs to be non-symmetric about one axis in order to measure Z-rotation and torque.

It should be appreciated that whilst in this embodiment the base 10 is essentially a layered sandwich construction of its various constituent components as shown in FIG. 1 where the elements are adjacent, in other embodiments there may be gaps or spacing between components.

It should also be appreciated that in this embodiment, four of the input portions 15*a*-15*d* are provided with four of all corresponding elements, for example, the apertures 20*a-d*, LED arrays 25*a-d*, photo diode arrays 30*a-d*, cavities 45*a-d*, inner surface regions 46*a-d*, terminations 50*a-d* and reflection regions 65*a-d*. In other embodiments five, six, seven, eight, nine or ten or more of the input portions 15 and corresponding elements may be provided. In yet other embodiments three, two or even one input portion 15 and corresponding elements may be provided. The number of input portions 15 designed into the arrangement will depend on various factors such as the overall size of the sensing arrangement 1 or fidelity of or confidence in measurement required by the particular application. At least three input portions 15*a*-15*d* that are not co-linear are required for measuring 3D torque, assuming the reflective regions are symmetric. More than 3 input portions 15*a*-15*d* may offer advantages in redundancy and possibly in reducing noise levels.

It should be noted that because the reflective region 65 is not symmetrical in at least one axis, the sensing arrangement will still be able to measure Z-axis torque with only a single input portion 15 and corresponding elements in this embodiment.

Figure 5:
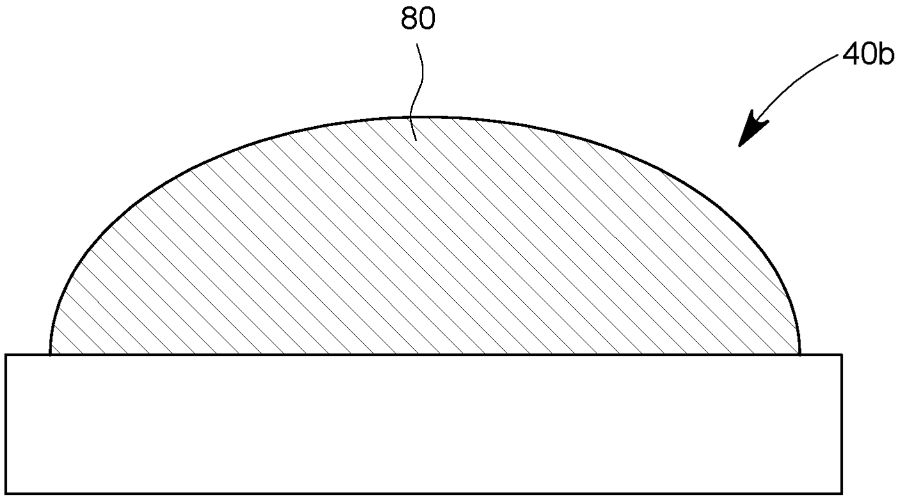
FIG. 5 shows a cross-sectional schematic view of a third embodiment of a sensing arrangement.

In an alternative embodiment shown in FIG. 5, the resilient silicone support 40 provides a contact surface 80 at the distal end 50 which is preferably curved. In this embodiment, the contact surface 80 is adapted to contact an object to be gripped, pushed or otherwise manipulated directly.

Figure 4:
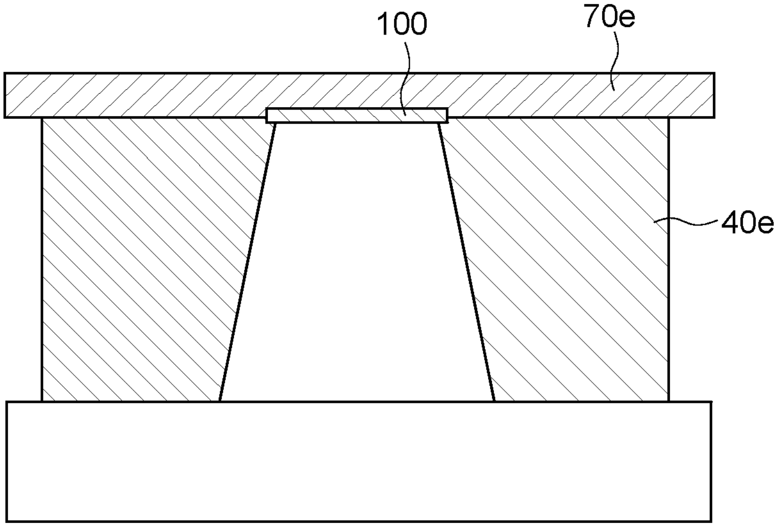
FIG. 4 shows a cross-sectional schematic view of a second embodiment of a sensing arrangement.

In an alternative embodiment, shown in FIG. 4 the reflective regions 100 are provided by a reflective under surface 100 of the mounting member 70*e* and not by a surface or region of resilient silicone support 40*e*.

In yet other embodiments, the reflective region or regions may be provided by any suitably reflective body, arrangement or surface that is adapted to provide the diffuse reflection of light in the spectral range of the light emitted by the light source. For example, if LED arrays are of coloured (e.g. red) or infra-red LEDs then the reflective regions will be adapted to reflect this spectral range of light and the light sensor arrays (such as photo diode arrays 30*a*, 30*b*) will be adapted to sense within that spectral range.

In yet other embodiments, the resilient silicone support 40, resilient silicone support 40*b* are made of any resilient material such as rubber or a flexible polymer. It is also envisaged that in other embodiments, which involve high force or torque application, the resilient material is of one which is not traditionally regarded as resilient but which still deflects (elastically deforms) within a suitable range based on the level of that force or torque. An example of such a material is a metal, glass or a hard plastic.

In alternative embodiments, the cavities may be filled with a fluid other than air, such as a substantially transparent oil. The cavities may also be filled with an alternative clear material, such as a substantially transparent silicone or any other suitable transparent fluid or material.

In this embodiment each of the two dimensional light sensor arrays 30*a*, 30*b* is an array of four photo diodes (in two rows and two columns). It should be appreciated, however, that in relation to a single cavity sensing arrangement with a reflector that is not symmetric on at least one axis any other array of light sensors may be suitable that has at least two positions along one axis and two positions along another different axis, where each position can receive reflected light without interference. For example, the light sensor arrays may be arrays of Light Emitting Diodes (LEDs) or complementary metal-oxide-semiconduction (CMOS) image sensor devices or charged coupled devices (CCD) image sensors. Various geometrical arrangements of light sensor arrays in alternative embodiments are shown in FIG. 6, such as where the light sensor array comprises light sensing elements that are located geometrically:

1. At each of 3 equally spaced vertices of a triangle 105
2. At each of 4 spaced apart vertices of a square 115
3. At each of 3 sectors of a circle 120
4. At each of 4 sectors of a circle 125
5. At each of 4 sectors of a circle, the sectors being separated 130
6. At each of 4 quadrants of a hexagon 135
7. At each of 3 parts of a triangle 140 (spaced apart or otherwise)
8. At each of 4 triangular shaped portions of a diamond 145 (spaced apart or otherwise)
9. At each of 4 quadrants of a 2×2 square array 146

Figure 6:
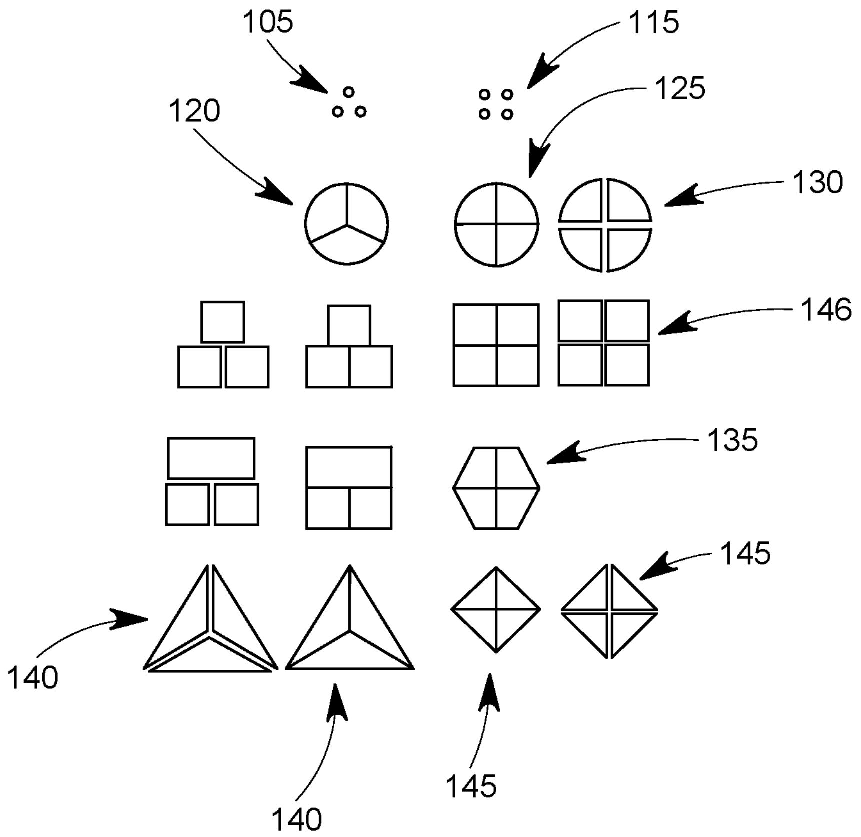
FIG. 6 shows a variety of light sensor array configurations according to various embodiments.

In this FIG. 6, the following reference numerals denote array configurations that would be suitable for the sensing arrangement 1: 115, 125, 130, 135,145 or 146.

In alternative embodiments, the panel 16 may be made of any other suitable rigid material, such as a metal or polymer.

Another embodiment of the sensing arrangement 1' according to another aspect of the present invention will now be described with reference to the embodiment of FIGS. 1-3 but specifying the differences. In this embodiment, at least two input portions 15*a*', 15*b*' are required and reflective regions 65*a*', 65*b*' can be symmetrical or asymmetrical, diffuse regions. The reflective regions 65*a*, 65*b* may be any suitable shape that suitably reflects light towards the light sensor array. They may, for example, be provided by a disc, either flat or curved.

In the case of the sensing arrangement 1', the two dimensional light sensor array of at least two rows and at least two columns of sensing arrangement 1 is not necessarily required. The light sensing in the sensing arrangement 1' is carried out by an arrangement of at least three light sensors that are not co-linear.

Advantageously, the provision of at least two light management arrangements, where light is emitted, reflected, managed then sensed and corresponding to input portions 15*a*', 15*b*', allows for Z-axis rotation and torque to be measured without necessarily requiring one of the reflective regions 65*a*', 65*b*' is asymmetrical in shape.

In various embodiments, including sensing arrangements 1, 1' three-dimensional force and torque are also measured.

Figure 7:
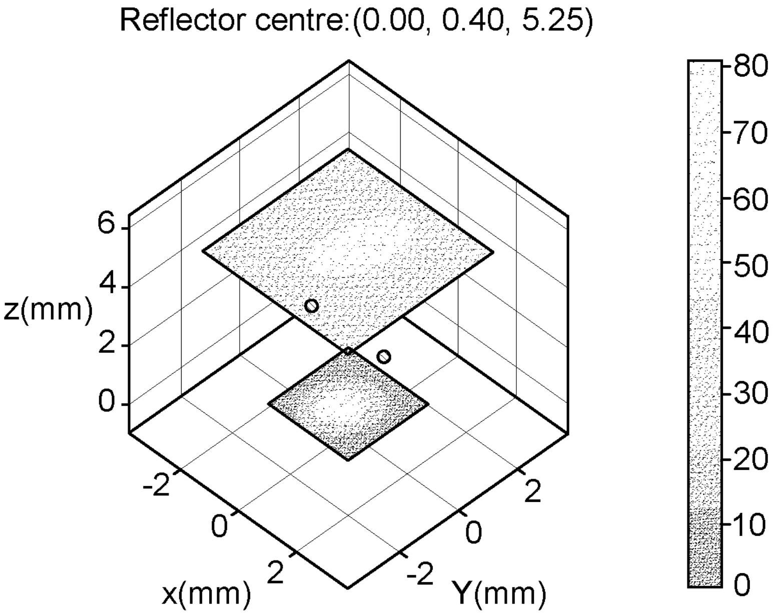
FIG. 7 shows simulation results of a pinhole instrumentation for an embodiment of a sensing arrangement of the first aspect (i.e. one cavity with a reflector that is non-symmetrical in one axis).

FIG. 7 shows simulation results of a pinhole instrumentation for an embodiment of a sensing arrangement of the first aspect (i.e. one cavity with a reflector that is non-symmetrical in one axis). This embodiment includes an elliptical reflector with x-axis radius 0.75 mm, y-axis radius 1.5 mm, a circular aperture with radius 0.4 mm and a 2×2 photodiode array with each element being 1.385×1.385 mm. The reflector to aperture distance is 3.5 mm and the photodiode to aperture distance is 2 mm.

Figure 8:
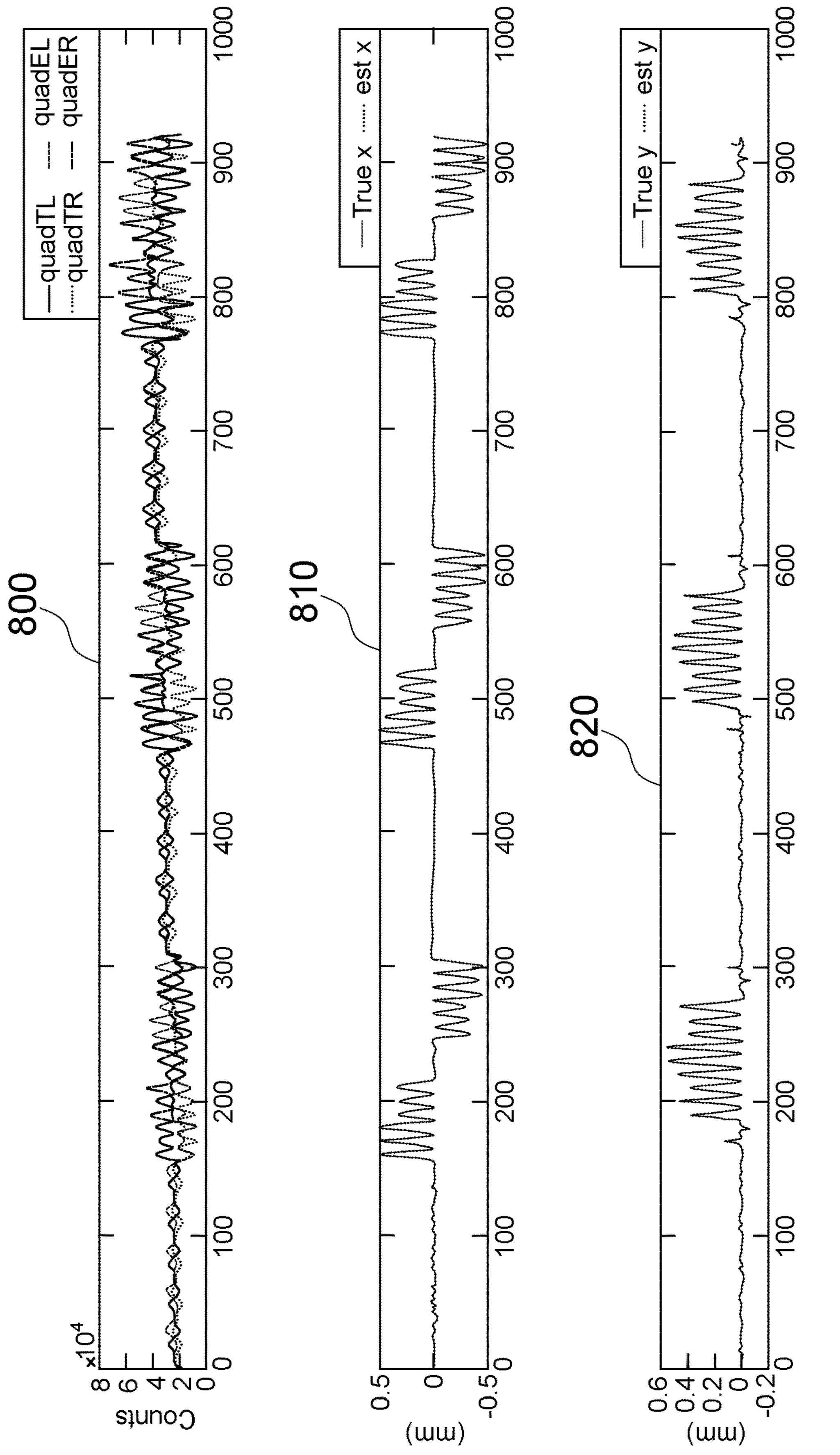
FIG. 8 shows a series of charts in relation to a simulated photodiode output of the embodiment of FIG. 7.
Figure 8:
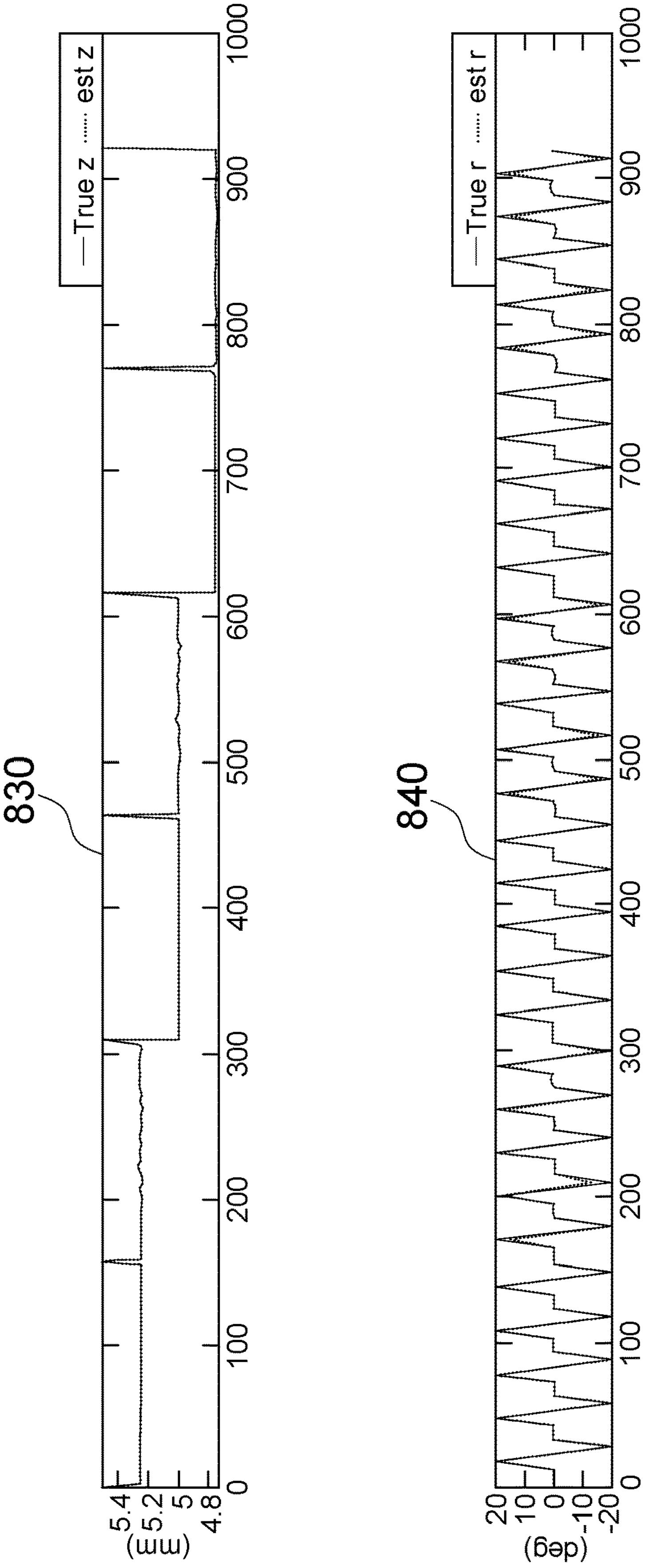

FIG. 8 shows a series of charts in relation to a simulated photodiode output of the embodiment of FIG. 7. Plot 800 is the simulated photodiode output from the 4 photodiodes quadTL, quadTR, quadBL and quadBR). Deflection and rotation of the reflector are plotted below with Plot 810 showing X deflection, Plot 820 showing Y deflection, Plot 830 showing Z deflection and Plot 840 showing Z rotation. The dotted lines in these plots show the estimated values which are calculated by 2nd order multi-variate polynomial regression (the features for the regression are the 4 photodiode outputs from Plot 800).

Figure 9:
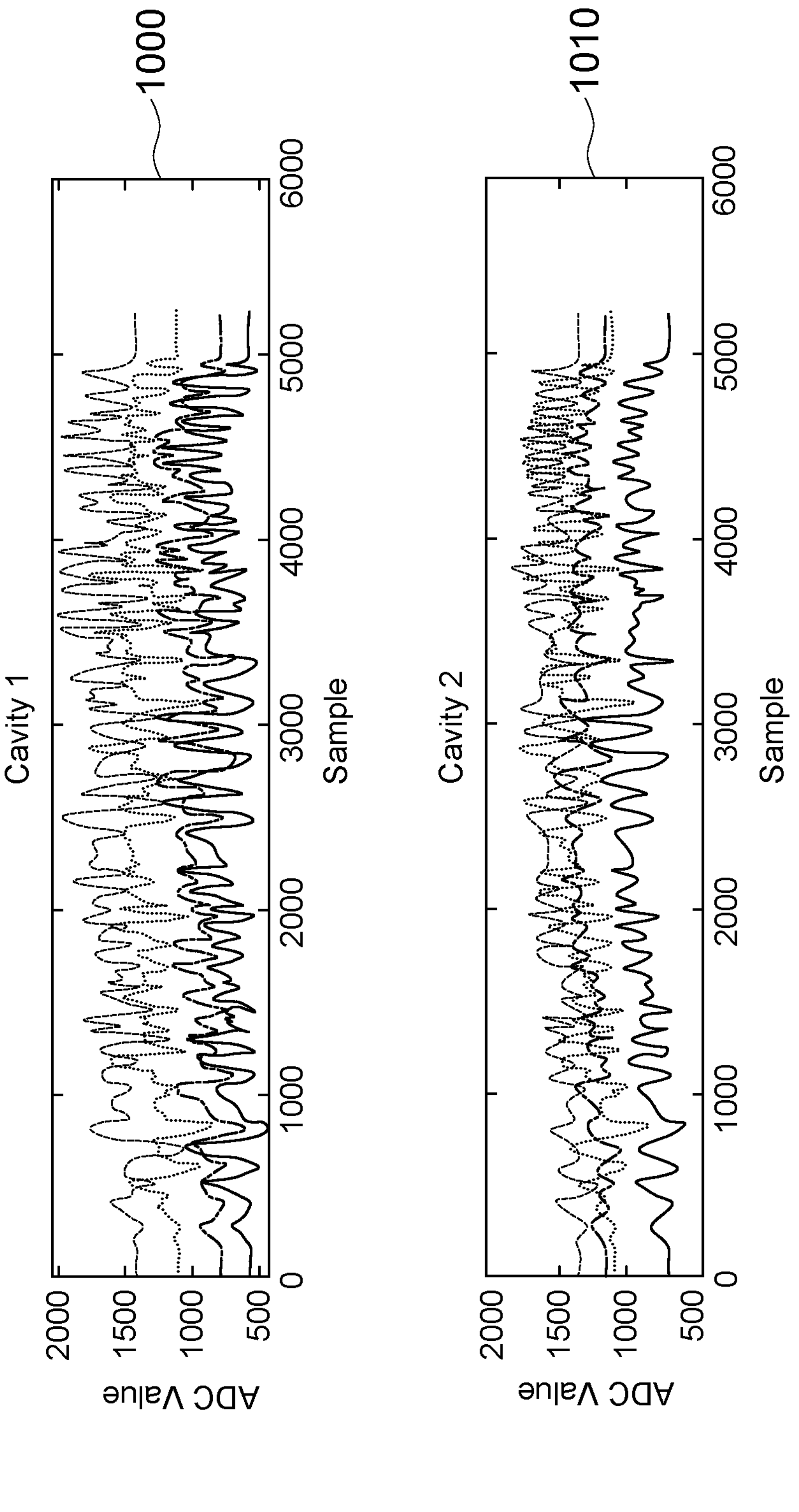
FIG. 9 shows real photodiode data from an embodiment with 4 cavities and circular reflectors of the second aspect of the sensing arrangement.
Figure 9:
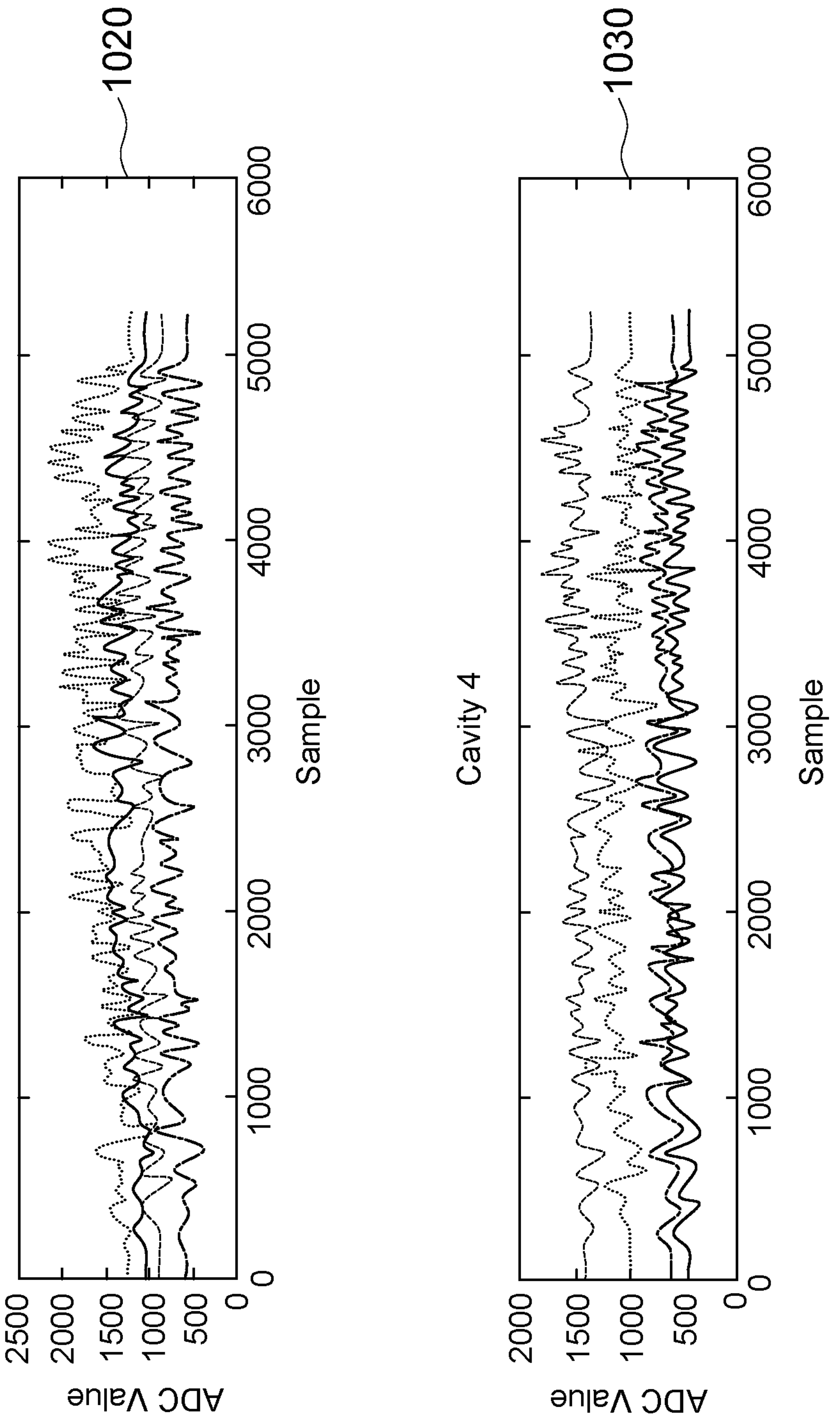

FIG. 9 shows real photodiode data from an embodiment with 4 cavities and circular reflectors of the second aspect of the sensing arrangement.

Figure 10:
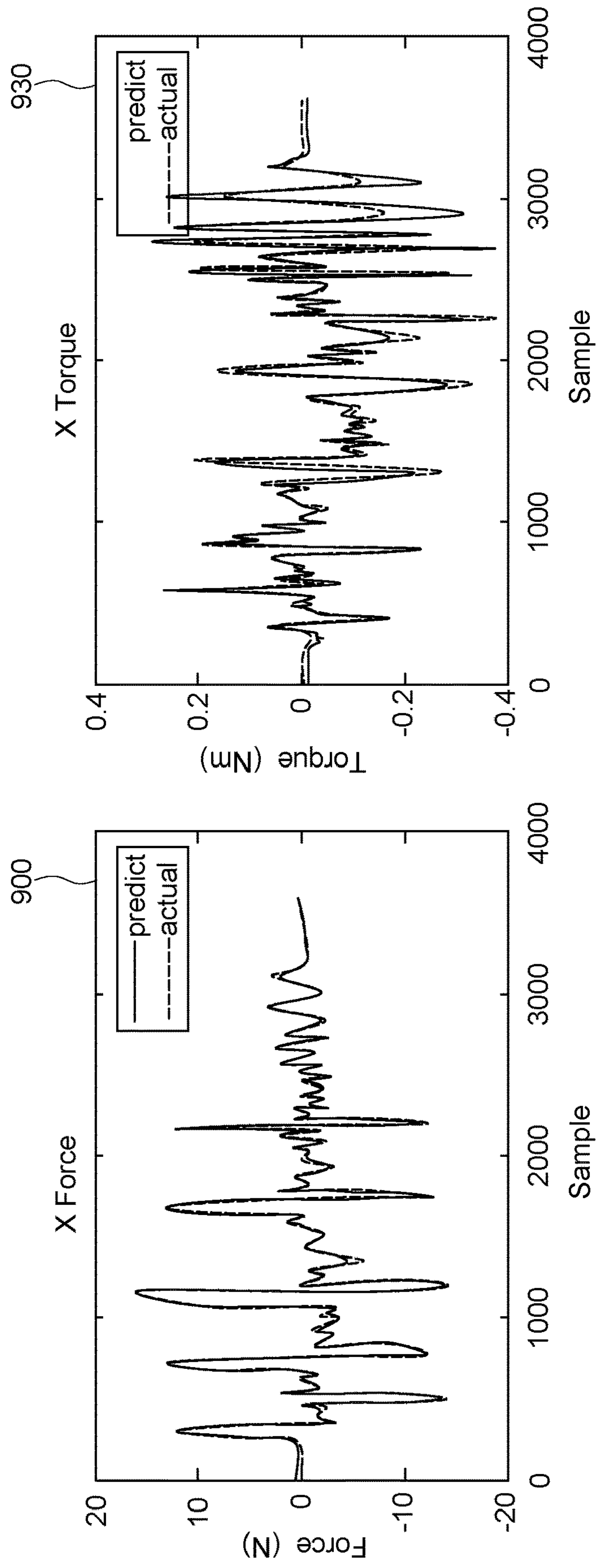
FIG. 10 Shows the XYZ force and XYZ torque actual values and estimated values which are calculated by applying multi-variate polynomial regression to the photodiode values of FIG. 9.
Figure 10:
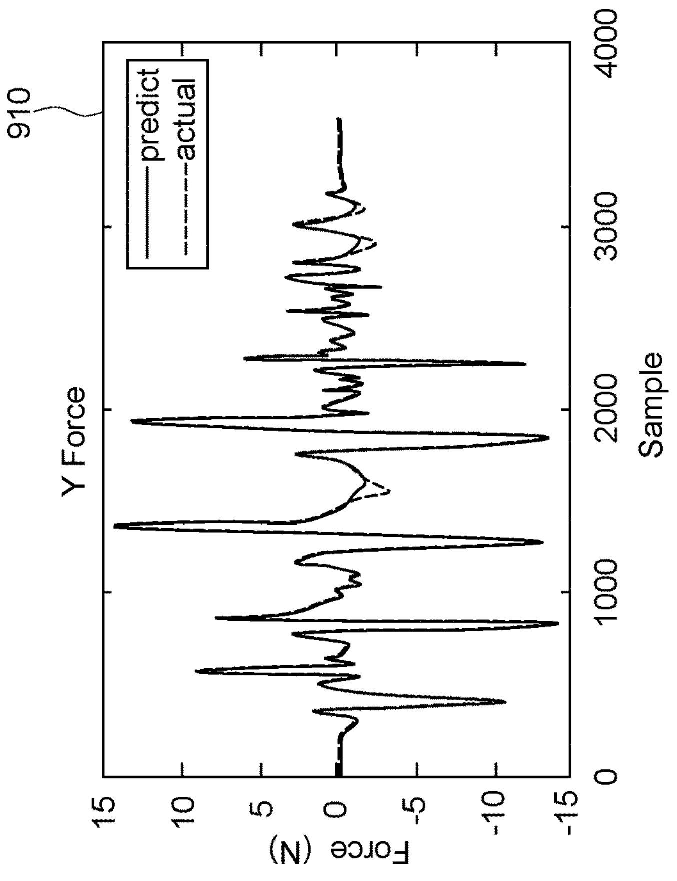
Figure 10:
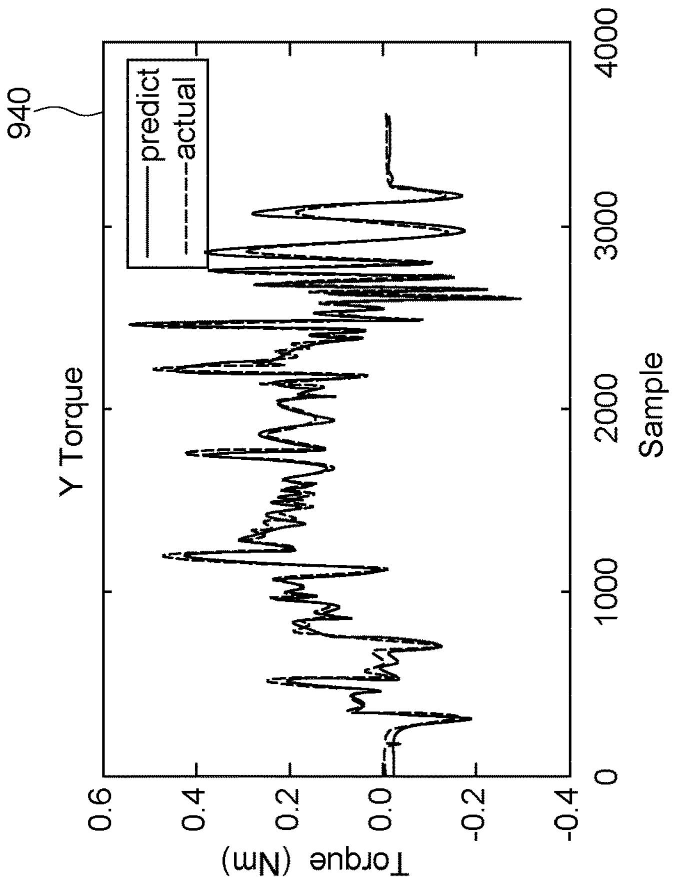
Figure 10:
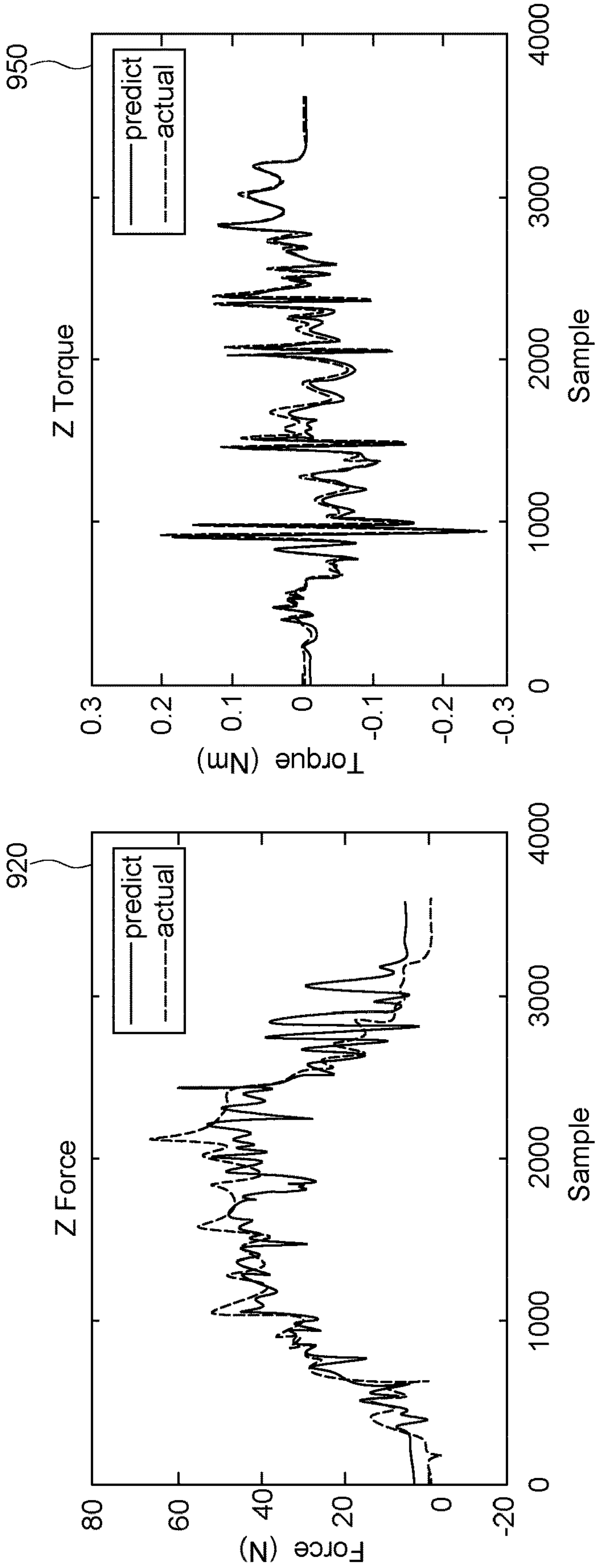

FIG. 10 Shows the XYZ force and XYZ torque actual values and estimated values which are calculated by applying multi-variate polynomial regression to the photodiode values of FIG. 9.

Figure 11:
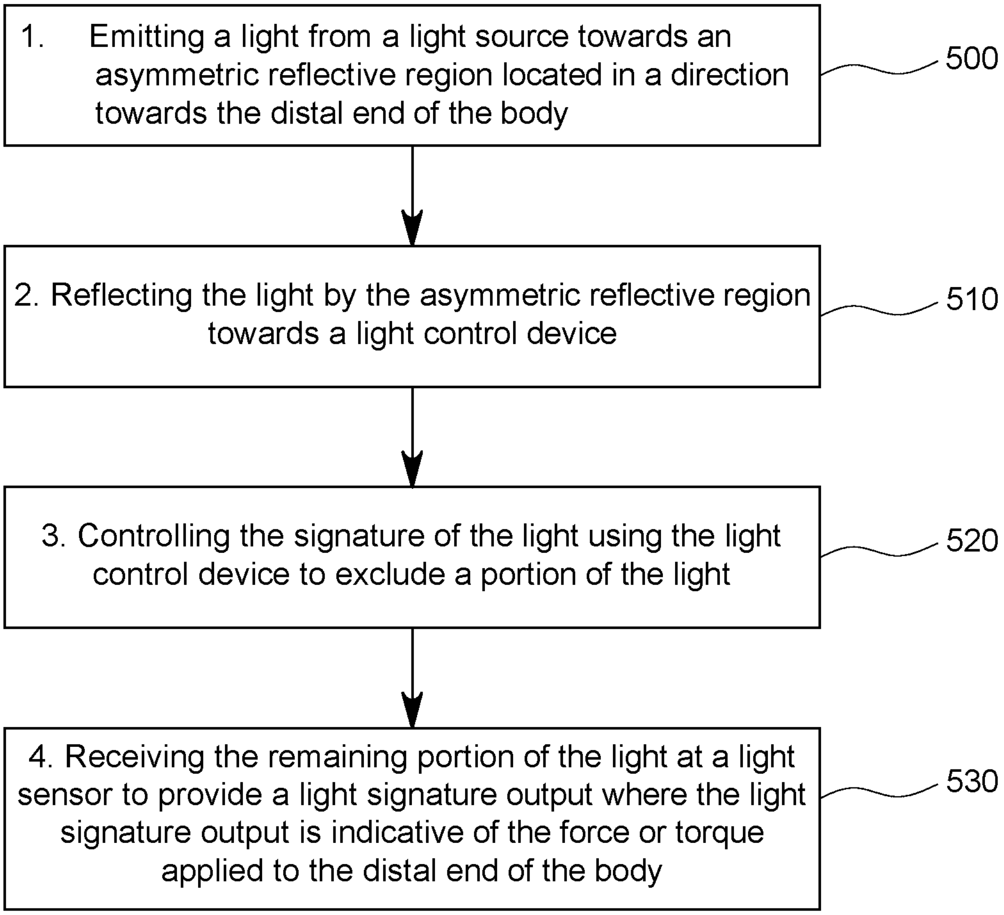
FIG. 11 shows a method for measuring a force or torque applied to a distal end of a body according to another embodiment of the present invention.

In another embodiment as shown in FIG. 11, a method is disclosed for measuring a force or torque applied to a distal end of a body, the method comprising the following steps:

1. emitting a light from a light source towards an asymmetric reflective region located in a direction towards the distal end of the body (500);
2. reflecting the light by the asymmetric reflective region towards a light control device (510);
3. controlling the signature of the light using the light control device to exclude a portion of the light (520); and
4. receiving the remaining portion of the light at a two-dimensional light sensor array, having at least two rows and two columns, to provide a light signature output where the light signature output is indicative of the force or torque applied to the distal end of the body (530).

Advantageously, the method can measure force or torque applied to a distal end of the body, irrespective of whether the distal end of the body is in direct contact with an object being gripped or is another component of a robot or machine.

Advantageously, the reflective region that is not symmetric about at least one axis allows for Z-axis rotation and torque to be measured.

It should be appreciated that the method comprising steps 500-530 could be implemented by the sensor arrangement 1.

Figure 12:
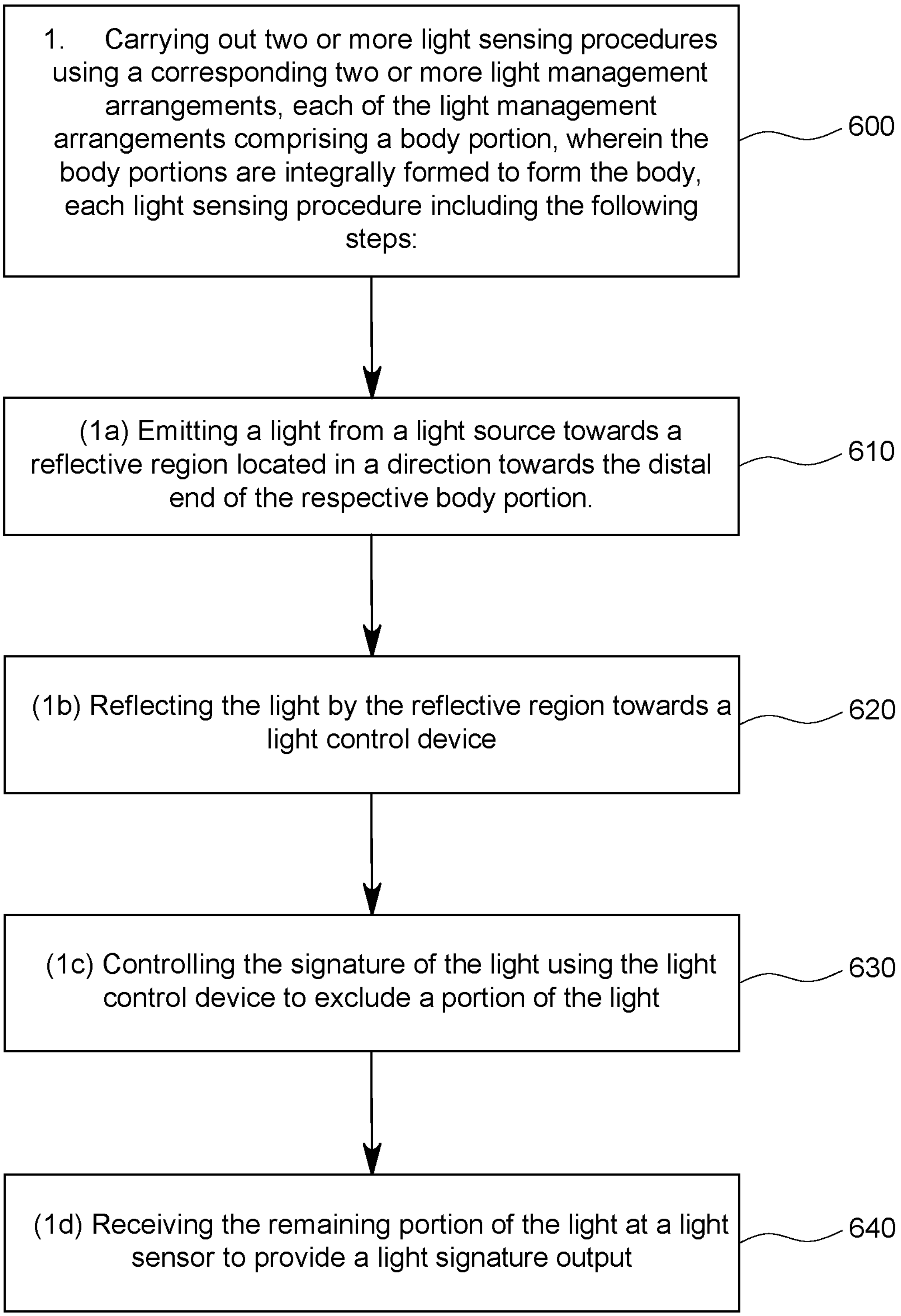
FIG. 12 shows an alternative method for measuring a force or torque applied to a distal end of a body according to another embodiment of the present invention.

In another embodiment as shown in FIG. 12, a method is disclosed for measuring a force or torque applied to a distal end of a body, the method comprising the following steps:

1. carrying out two or more light sensing procedures using a corresponding two or more light management arrangements, each of the light management arrangements comprising a body portion, wherein the body portions are integrally formed to form the body, each light sensing procedure including the following steps: (600)

(1a) emitting a light from a light source towards a reflective region located in a direction towards the distal end of the respective body portion; (610)

(1b) reflecting the light by the reflective region towards a light control device; (620)

(1c) controlling the signature of the light using the light control device to exclude a portion of the light; (630) and (1d) receiving the remaining portion of the light at a light sensor arrangement of at least three light sensors that are not colinear to provide a light signature output. (640).

In this manner, the two or more light signature outputs are, when considered together, indicative of the force or torque applied to the distal end of the body.

Advantageously, the method can measure force or torque applied to a distal end of the body, irrespective of whether the distal end of the body is in direct contact with an object being gripped or is another component of a robot or machine.

Since the sensing arrangement comprises an integral body connected to the base, the overall arrangement can be less physically complex than some prior art arrangements.

Advantageously, the provision of at least two light sensing procedures using a corresponding two or more light management arrangements, each comprising a body portion, wherein the body portions are integrally formed to form the body, allows for Z-axis and another axis of rotation and torque applied to the distal end of the body to be measured without the need for an asymmetric reflector.

It should be appreciated that this method comprising steps 600-640 could be implemented by the sensor arrangement 1'.

In all embodiments, the design parameters are optimised such that for the predetermined range of forces or torques applied to the distal end of the body 5, the light received by the light sensor arrays 30 or arrangements 30' moves across the light sensor arrays 30 or arrangements 30' within a working range. The design parameters comprise:

(i) the size/diameter of each of reflective regions 65
(ii) the size/diameter of each of the apertures 20
(iii) the arrangement of the light sensor arrays 30 or arrangements 30'
(iv) the distance between the apertures 20 and the reflective region 65
(v) the distance between the apertures 20 and the light sensors arrays 30 or arrangements 30'.
(vi) the size of the light sensor arrays 30 or arrangements 30'.
(vii) the elasticity of the resilient support 40

Where the resilient support 40 is made from a stiffer material, the sensing arrangement 1 will be less sensitive but have a larger sensing range (all other parameters being equal). Likewise, where the resilient support 40 is made of a more elastic material, the sensing arrangement 1 will be more sensitive but have a smaller sensing range (all other parameters being equal).

The aperture 20 diameter may be adjusted in order to optimise the linearity of the sensing arrangement 1 output over a particular range of stimulus.

Here are some examples of design parameters associated with three embodiments X, Y and Z that have been identified as suitable:

from a dark coloured silicone, in that case, black in colour, to reduce light reflection interference, in this embodiment those characteristics are reversed. In this embodiment, the reflective regions 65$a$, 65$b$ (65$c$, 65$d$ not shown) 40 are made from a dark coloured silicone, such as black in colour and the resilient silicone support 40 is formed of an opaque, white coloured silicone that reflects light well but in a diffuse manner. Further, the surface of the reflective regions 65$a$, 65$b$ (65$c$, 65$d$ not shown) are matte to reduce reflection interference. This matte surface texture is achieved during the molding process by molding the silicone in a mold with a correspondingly textured surface. The reflective regions 65$a$, 65$b$ (65$c$, 65$d$ not shown) are co-molded with the remainder of the resilient silicone support 40.

The end results is that instead of a light signature being received by the light sensor array, a black spot is received that corresponds to a force or torque applied to the distal end of the body. An inverse computational process is then used to calculate these forces and torques.

The sensing arrangements 1, 1' and according to other embodiments are connected to a control device for powering whatever light source is used (e.g. the LED arrays 25$a$, 25$b$) and for receiving an output signal and/or data from the light sensor array or arrangement 30 (e.g. the photo diode arrays or arrangements 30$a$, 30$b$) in order to process it. In one embodiment, the control device might typically comprise a:

(i) Microprocessor connected to the light source(s) and to the light sensor(s)
(ii) A power unit connected to and for powering the microprocessor and the light source(s)
(iii) Memory in connection with the microprocessor, storing computer readable instructions for execution by the microprocessor.

Figure 13:
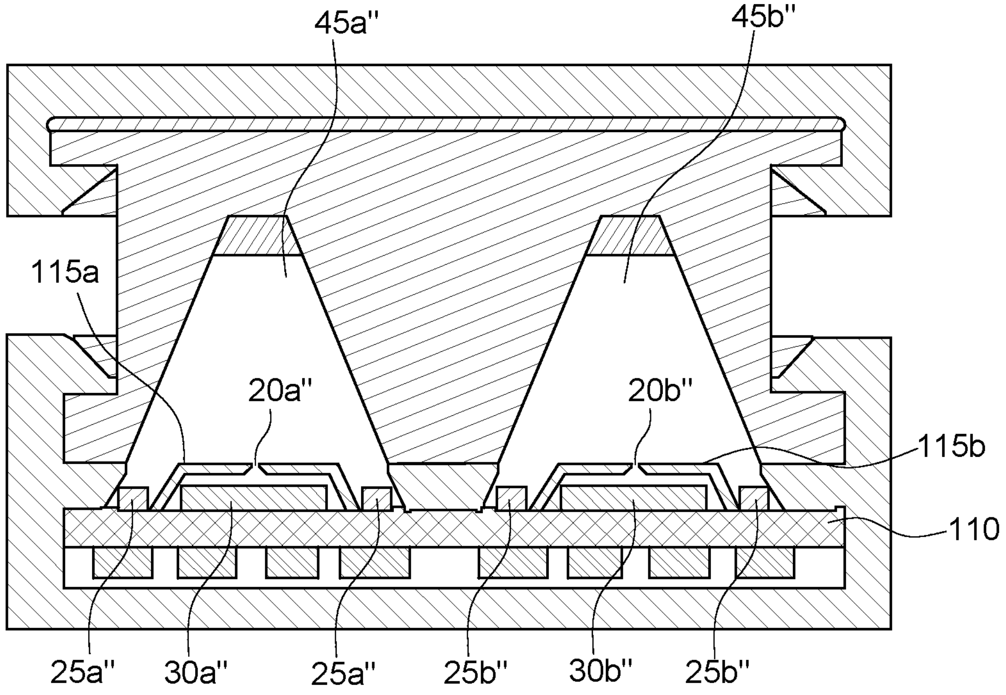
FIG. 13 shows a cross-sectional schematic view of a single-PCB embodiment of a sensing arrangement.

Referring now to FIG. 13, a single-PCB embodiment of a sensing arrangement 1" is provided.

The sensing arrangement 1" may be of similar construction to the sensing arrangement 1, the sensing arrangement 1' or any of the variations described in this specification, other than in respect of the following. Firstly, the base 10" comprises a single printed circuit board 110 to which are

| | Embodiment X | Embodiment Y | Embodiment Z |
|---|---|---|---|
| Reflector diameter (mm) | 1.8 | 4.5 | 0.4 |
| Aperture diameter (mm) | 0.9 | 1 | 0.8 |
| Photodiode Area ($mm^2$) * | 1 | 1.96 | 1 |
| Reflector-to-aperture distance (mm) | 2.2 | 8 | 1.6 |
| Aperture-to-photodiode distance (mm) | 0.9 | 4.8 | 0.4 |
| 1 mm deflection of reflector = X mm deflection of projected light spot | 0.41 | 0.6 | 0.25 |

* per individual square photodiode

In other embodiments, the resilient support 40$b$ is at least opaque to the frequencies of light, the light sensor arrays 25 or arrangements 25' are sensitive to. Likewise, in other embodiments, the reflective regions 65, 65' must at least be reflective of the frequencies of light that the light sensor arrays 25 or arrangements 25' are sensitive to.

In other embodiments, the apertures 20, 20' may not be circular but a different, suitable shape.

In other embodiments, there is an inversion of the light characteristics of the reflective regions 65$a$, 65$b$ (65$c$, 65$d$ not shown) and the resilient silicone support 40. Whilst in earlier embodiments, the reflective regions 65$a$, 65$b$ (65$c$, 65$d$ not shown) are formed of an opaque, white coloured silicone that reflects light well but in a diffuse manner and the remainder of the resilient silicone support 40 is made mounted (i) at least one light source, in this embodiment taking the form of a four LED Array 25$a$", 25$b$" (25$c$", 25$d$" not shown) (ii) a light control portion, in this embodiment taking the form of a thin-walled truncated cone 115$a$-$d$, and (iii) an arrangement of light sensors, such as a two dimensional array (e.g. four photo diode array 30$a$"-$d$") as shown or three light sensors that are not co-linear.

The thin-walled truncated cone 115 sits over the top of the arrangement of light sensors such that it extends between the reflective region and the arrangement of at light sensors.

Each thin-walled truncated cone 115$a$-$d$ comprises an aperture 20$a$", 20$b$", 20$c$" and 20$d$" respectively that extends through the thin-wall and has a centre, in this embodiment, which is aligned with the axis of the truncated cone.

The at least one light source, in this case a four LED array 25*a*", 25*b*", 25*c*" and 25*d*" are located adjacent and surrounding each of truncated cones 115*a-d* and within the respective cavities 45*a*", 45*b*", 45*c*" and 45*d*".

The thin-walled truncated cones 115*a-d* may be made of ABS, PLA, Aluminium or any other suitable material.

Each of the apertures 20*a*", 20*b*", 20*c*" and 20*d*" are also cone-shaped in cross-section to make the effective thickness of the cones 115*a-d* as thin as possible.

Interpretation

Markush Groups

In addition, where features or aspects of the invention are described in terms of Markush groups, those skilled in the art will recognise that the invention is also thereby described in terms of any individual member or subgroup of members of the Markush group.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the processor may operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

As used herein the term "and/or" means "and" or "or", or both.

As used herein "(s)" following a noun means the plural and/or singular forms of the noun.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the robotics industry.

The invention claimed is:

1. A sensing arrangement for measuring a force or torque applied to a distal end of a body, the sensing arrangement comprising:

a base comprising at least one input portion, the at least one input portion comprising:

a light control portion;

at least one light source; and a two-dimensional light sensor array having at least two rows and two columns; and the body connected, at a proximal end, to the base, the body comprising:

a resilient support;

at least one alternative light transmission region corresponding to the at least one input portion and extending from the proximal end towards the distal end and terminating at a light transmission region termination; and a reflective region that is not symmetric about at least one axis and is located at the light transmission region termination;

wherein the at least one light source is configured such that it emits light towards the reflective region;

the sensing arrangement being such that, in respect of one of the at least one input portions and a corresponding one of the at least one alternative light transmission regions in use, light from the at least one light source passes through the alternative light transmission region towards the reflective region, is reflected by the reflective region through the light control portion, the light control portion excluding a portion of the reflected light and allowing a remaining portion of the reflected light to pass through towards the two-dimensional light sensor array, in use, such that the two-dimensional light sensor array receives a light signature from the received remaining portion of the light that corresponds to a force or torque applied to the distal end of the body.

2. The sensing arrangement as claimed in claim 1, wherein the body comprises a mounting member at its distal end for mounting the sensing arrangement to an object to be sensed.

3. The sensing arrangement as claimed in claim 2, wherein the mounting member is attached to the body at its distal end by mechanical interlock.

4. The sensing arrangement as claimed in claim 3, wherein the mounting member is attached to the resilient support of the body at its distal end by mechanical interlock.

5. The sensing arrangement as claimed in claim 2, wherein the reflective region is a surface of the mounting member.

6. The sensing arrangement as claimed in claim 2, wherein the two-dimensional light sensor array is:

(i) an arrangement of at least four light emitting diodes (LEDs);

(ii) an arrangement of at least four photo diodes;

(iii) a complementary metal-oxide-semiconduction (CMOS) image sensor; or (iv) a charged coupled device (CCD) image sensor.

7. The sensing arrangement as claimed in claim 1, comprising a contact surface wherein the contact surface is provided by the resilient support at the distal end of the body.

8. The sensing arrangement as claimed in claim 7, wherein the contact surface is curved.

9. The sensing arrangement as claimed in claim 1, wherein a proximal end of the at least one alternative light transmission regions extend from the base.

10. The sensing arrangement as claimed in claim 1, wherein the at least one alternative light transmission regions is a cavity.

11. The sensing arrangement as claimed in claim 10, wherein the cavity is filled with a fluid.

12. The sensing arrangement as claimed in claim 11, wherein the fluid is air.

13. The sensing arrangement as claimed in claim 11, wherein the fluid is a transparent oil.

14. The sensing arrangement as claimed in claim 10, wherein the cavity is filled with a transparent silicone.

15. The sensing arrangement as claimed in claim 1, wherein the base comprises a printed circuit board and the at least one light source is mounted to the printed circuit board.

16. The sensing arrangement as claimed in claim 1, wherein the light control portion comprises an aperture.

17. The sensing arrangement as claimed in claim 16, wherein the aperture is circular.

18. The sensing arrangement as claimed in claim 1, wherein the light control portion extends between the reflective region and the two-dimensional light sensor array.

19. The sensing arrangement as claimed in claim 1, wherein a printed circuit board is adjacent to the light control portion.

20. The sensing arrangement as claimed in claim 1, wherein the reflective region is a diffuse reflective region.

21. The sensing arrangement as claimed in claim 1, wherein the reflective region is an inner surface region of the resilient support.

22. The sensing arrangement as claimed in claim 21, wherein the reflective region is a reflector located at the inner surface region.

23. The sensing arrangement as claimed in claim 1, wherein the reflective region is oval in shape.

24. The sensing arrangement as claimed in claim 1, wherein the reflective region is elliptical in shape.

25. The sensing arrangement as claimed in claim 1, wherein the at least one input portion is two or more input portions and the at least one alternative light transmission region is two or more alternative light transmission regions, each alternative light transmission region corresponding to an input portion.

26. The sensing arrangement as claimed in claim 1, wherein the base further comprises a housing enclosing the light control portion, the at least one light source and the two-dimensional light sensor array, the housing being fixed in relation with a proximal end of the resilient support.

27. The sensing arrangement as claimed in claim 1, wherein the base comprises a printed circuit board to which are mounted, (i) the at least one light source, (ii) the light control portion and (iii) the two-dimensional light sensor array, such that the light control portion extends between the reflective region and the two-dimensional light sensor array.

28. The sensing arrangement as claimed in claim 27, wherein the light control portion has an outside form factor approximating a truncated cone, is thin-walled, and has an aperture located through the thin-wall and aligned with the axis of the truncated cone.

29. The sensing arrangement as claimed in claim 28, wherein the at least one light source is located adjacent the truncated cone within the alternative light transmission region.

30. The sensing arrangement as claimed in claim 1, wherein the resilient support is an opaque dark-colored silicone.

31. A sensing arrangement for measuring a force or torque applied to a distal end of a body, the sensing arrangement comprising:

two or more light management arrangements, each light management arrangement comprising:

a base portion comprising an input portion, the input portion comprising:

a light control portion;

at least one light source; and an arrangement of at least three light sensors, where the at least three light sensors are arranged such that they are not co-linear;

a body portion connected, at a proximal end, to the base portion, the body portion comprising:

a resilient support portion; and an alternative light transmission region corresponding to the input portion and extending from the proximal end towards the distal end of the body and terminating at a light transmission region termination; and a reflective region located at the light transmission region termination;

wherein the at least one light source is configured such that it emits light towards the reflective region;

wherein, in respect of the two or more light management arrangements, the base portions form a base, the resilient support portions are integral and form a resilient support and the body portions form a body;

each of the two or more light management arrangements being arranged such that, in use, light from the at least one light source passes through the alternative light transmission region towards the reflective region, is reflected by the reflective region through the light control portion, the light control portion excluding a portion of the reflected light and allowing a remaining portion of the reflected light to pass through towards the arrangement of at least three light sensors, such that the arrangement of at least three light sensors receives a light signature from the received remaining portion of the light that corresponds to a force or torque applied to the distal end of the body portion.

32. The sensing arrangement as claimed in claim 31, wherein the body comprises a mounting member at its distal end for mounting the sensing arrangement to an object to be sensed.

33. The sensing arrangement as claimed in claim 32, wherein the mounting member is attached to the body at its distal end by mechanical interlock.

34. The sensing arrangement as claimed in claim 33, wherein the mounting member is attached to the resilient support at the distal end of the body by mechanical interlock.

35. The sensing arrangement as claimed in claim 32, wherein the reflective region is a surface of the mounting member.

36. The sensing arrangement as claimed in claim 31, comprising a contact surface wherein the contact surface is provided by the resilient support at the distal end of the body.

37. The sensing arrangement as claimed in claim 36, wherein the contact surface is curved.

38. The sensing arrangement as claimed in claim 31, wherein a proximal end of the alternative light transmission region extends from the base portion.

39. The sensing arrangement as claimed in claim 31, wherein the alternative light transmission region is a cavity.

40. The sensing arrangement as claimed in claim 39, wherein the cavity is filled with a fluid.

41. The sensing arrangement as claimed in claim 40, wherein the fluid is air.

42. The sensing arrangement as claimed in claim 40, wherein the fluid is a transparent oil.

43. The sensing arrangement as claimed in claim 39, wherein the cavity is filled with a transparent silicone.

44. The sensing arrangement as claimed in claim 31, wherein the base comprises a printed circuit board and the at least one light source of each base portion is mounted to the printed circuit board.

45. The sensing arrangement as claimed in claim 31, wherein the light control portion comprises an aperture.

46. The sensing arrangement as claimed in claim 31, wherein the light control portion is arranged to control the light received by the arrangement of at least three light sensors.

47. The sensing arrangement as claimed in claim 31, wherein the at least one input portion is two or more input portions and the at least one alternative light transmission region is two or more alternative light transmission regions, each alternative light transmission region corresponding to an input portion.

48. The sensing arrangement as claimed in claim 31, wherein the reflective region is a diffuse reflective region.

49. The sensing arrangement as claimed in claim 31, wherein the reflective region is an inner surface region of the resilient support.

50. The sensing arrangement as claimed in claim 31, wherein the reflective region is a reflector located at an inner surface region of the resilient support.

51. The sensing arrangement as claimed in claim 31, wherein the reflective region is non-symmetric about at least one axis.

52. The sensing arrangement as claimed in claim 51, wherein the reflective region is oval in shape.

53. The sensing arrangement as claimed in claim 51, wherein the reflective region is elliptical in shape.

54. The sensing arrangement as claimed in claim 31, wherein the arrangement of at least three light sensors is:

(i) an arrangement of three LEDs;

(ii) an arrangement of three photo diodes;

(iii) a complementary metal-oxide-semiconduction (CMOS) image sensor; or (iv) a charged coupled device (CCD) image sensor.

55. The sensing arrangement as claimed in claim 54, wherein the light control portion comprises a circular aperture.

56. The sensing arrangement as claimed in claim 31, wherein the base further comprises a housing enclosing a printed circuit board, the light control portion, the at least one light source and the arrangement of at least three light sensors, the housing and the proximal end of the resilient support being in fixed relation.

57. The sensing arrangement as claimed in claim 31, wherein the resilient support is an opaque, black-colored silicone.

58. The sensing arrangement as claimed in claim 31, wherein the base comprises a printed circuit board and in respect of each base portion, (i) the at least one light source, (ii) the light control portion and (iii) the arrangement of at least three light sensors, are mounted to the printed circuit board such that the light control portion extends between the reflective region and the arrangement of at least three light sensors.

59. The sensing arrangement as claimed in claim 58, wherein the light control portion has an outside form factor approximating a truncated cone, is thin-walled, and has an aperture located through the thin-wall and aligned with an axis of the truncated cone.

60. The sensing arrangement as claimed in claim 59, wherein the at least one light source is located adjacent the truncated cone within the alternative light transmission region.

* * * * *